United States Patent Office 2,724,613
Patented Nov. 22, 1955

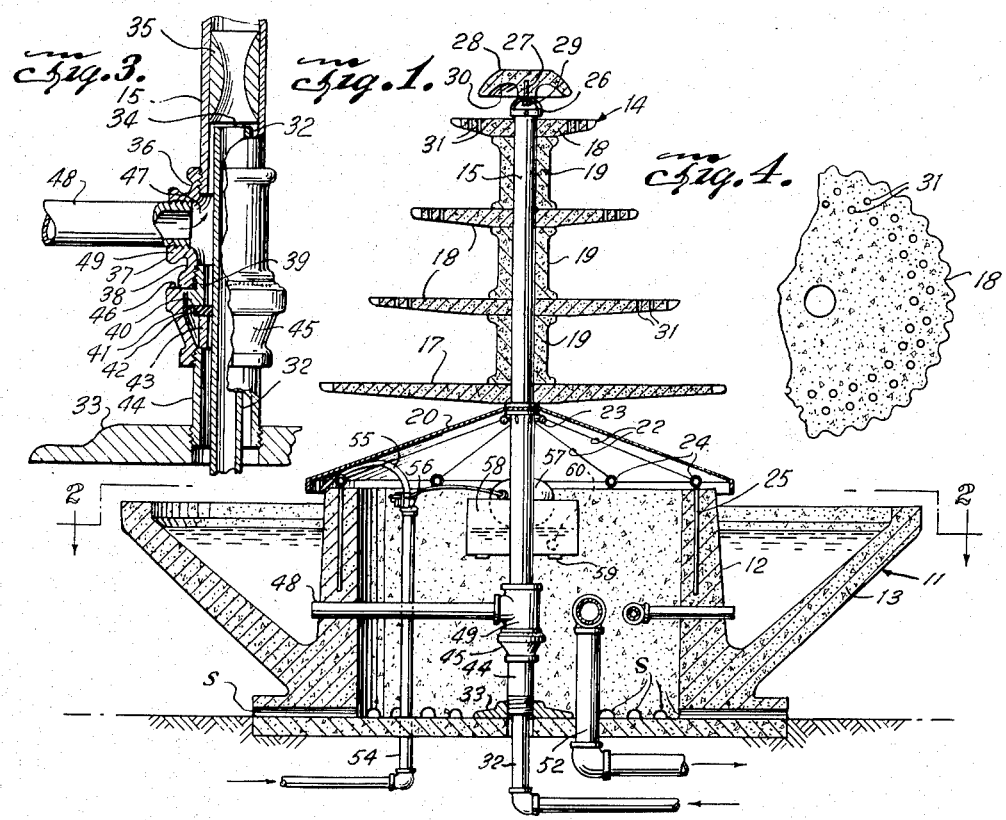
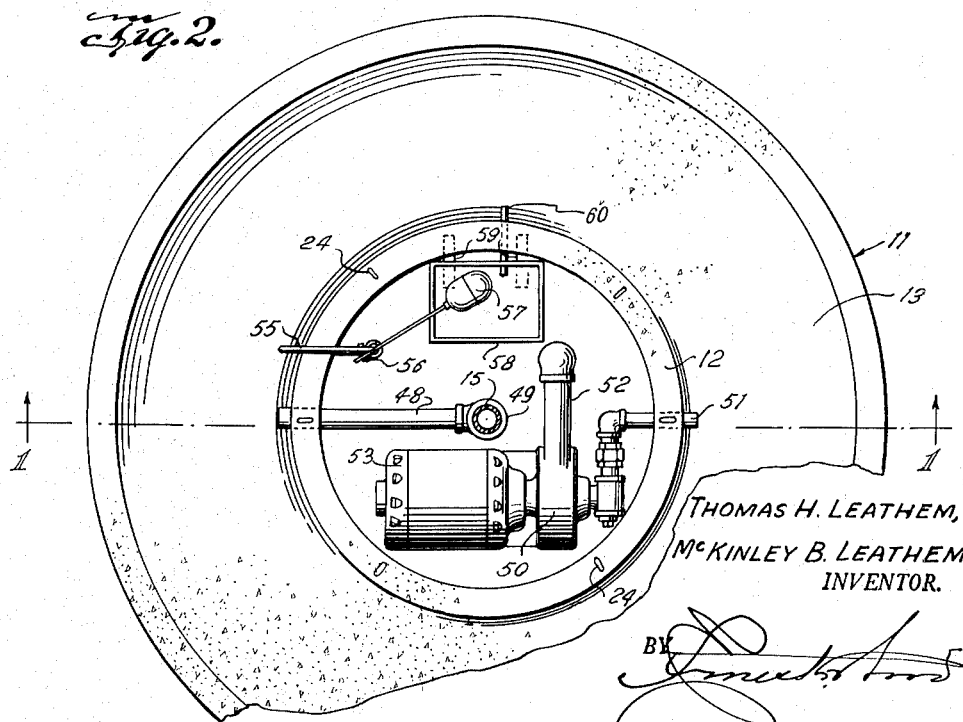

2,724,613

COOLING TOWER FOR AIR CONDITIONING SYSTEMS

Thomas H. Leathem, Jr., and McKinley B. Leathem, Sr., Dallas, Tex.

Application January 21, 1952, Serial No. 267,472

4 Claims. (Cl. 299—6)

This invention relates to cooling systems and more particularly to a system for cooling liquid by evaporation and by exposure to air of a lower temperature.

In many applications it is necessary to cool water by removing heat therefrom by evaporative processes and also by conduction to cooler surroundings. For example, in refrigerating systems such as those employed to cool buildings and homes, water is sprayed over the condenser coils of the refrigerating system to cool and condense the refrigerant gas circulating therethrough. The water absorbs heat in this process and its temperature rises. This water must then be cooled before it can again be sprayed over the condenser coils. Conventional cooling towers are unsightly and it is desirable, therefore, to employ an ornamental cooling fountain which sprays or dispenses the warm water through the air to allow evaporative processes, as well as conduction to the cooler air, to lower the temperature of the water. The cooling fountain must lower the temperature a desired amount efficiently without undue waste or loss of water such as occurs if the water is sprayed into a fine mist which can be blown away by the wind. It is also desirable, therefore, to provide a cooling fountain which will prevent undue waste of the water and a recirculating system which allows a prolonged exposure of the water to the air to permit the water to be exposed to cooling processes for a length of time necessary to lower its temperature to a predetermined degree.

Accordingly, it is an object of the invention to provide a new and improved cooling system.

It is another object of the invention to provide a new and improved cooling system for lowering the temperature of water.

It is another object of the invention to provide a new and improved cooling fountain.

It is still another object of the invention to provide a new and improved cooling fountain which prevents undue waste of water.

It is a further object of the invention to provide a new and improved cooling fountain having means for recirculating water over the fountain.

It is a still further object of the invention to provide a new and improved cooling system having a cooling fountain and a means for recirculating the water over the fountain.

Briefly stated, the new and improved cooling system includes a cooling fountain having a vertical tower rising above a reservoir. The tower comprises a plurality of vertically spaced disks of progressively greater diameters over which water passing through a conduit in the tower and discharged from the upper end of the tower may progressively descend to be cooled by evaporation and conduction during its descent to the reservoir. The reservoir is connected to the supply conduit through a venturi so that a portion of the water which has descended over the tower is drawn by the venturi effect back into the supply conduit to again be discharged from the upper end of the tower and thus be recirculated to further lower the temperature of the water. A compartment located below the tower houses a float controlled valve for supplying additional water to maintain a desired level of water in the reservoir pump for drawing cooled water from the reservoir and a motor for driving the pump.

For a better understanding of the invention, reference may be had to the following description and the accompanying drawing and its scope will be pointed out in the appended claims.

In the drawing,

Figure 1 is a vertical sectional view of the cooling system taken on the line 1—1 of Figure 2;

Figure 2 is a fragmentary horizontal sectional view taken on the line 2—2 of Figure 1;

Figure 3 is a vertical sectional view of the venturi arrangement; and,

Figure 4 is a fragmentary top plan view of one of the disks of the tower.

Referring now to the drawing, the illustrated embodiment of the invention comprises a cooling fountain 10 having an annular reservoir 11 whose central inner annular wall 12 and outwardly and upwardly inclined wall 13 provide an annular trough in which water descending from the cooling tower 14 is collected. The tower 14 comprises a central supporting conduit 15 having an external flange 16 which supports a bottom disk 17 and a plurality of perforated disks 18 of progressively smaller diameters through whose central apertures the supporting conduit extends. A spacing collar 19 on the supporting conduit is disposed between each pair of disks to space them vertically from each other.

A substantially conical sheet metal cover 20 is suspended on the flange 16 and extends therefrom over the inner annular wall of the reservoir to prevent water from falling into the compartment 21 formed by the inner wall as well as to conceal from view the compartment and the various devices contained therein. The sheet metal cover may be made in two pieces (not shown) detachably secured together to enable it to be easily removed. Or, it may be made removable in any other conventional manner.

The supporting conduit 15 is braced and held in position by a plurality of rods or stays 22 whose upper ends are looped through eyelets 23 rigidly secured to the supporting conduit below the flange and whose lower ends are looped through the eyes 24 on the upper ends of rods 25 embedded in the concrete of the inner wall 12.

The upper end of the supporting conduit 15 is provided with a bracket 26 having a threaded aperture through which passes a screw 27 whose upper end is embedded in the concrete of the diverter 28. A nut 29 on the lower exposed end of the screw serves to lock the diverter in place. The reservoir, the disks, the collars and the diverter are preferably formed of white waterproof concrete.

The water flowing out the upper end of the supporting conduit strikes the curved annular surfaces 30 on the bottom side of the diverter and is diverted downwardly to the top perforated disk 18. The water passes through the apertures 31 near the outer edge of the disk and over the serrated edge of the disks to the next lower perforated disk 18, and then successively to the next lower perforated disk 18 and the bottom disk 17. The bottom disk is not perforated but its periphery is serrated. From the bottom disk, the water falls onto the cover 20 and into the reservoir.

It will be apparent that the water is not sprayed or dispensed into a fine spray which could be blown away by a wind. The water is, however, broken into many streams and sheets so that large areas of water surface are formed from which evaporation can take place thus facilitating the cooling of the water. Moreover, the large areas of water surface also facilitate the loss of heat from the water to the cooler air through conduction.

Water to be cooled is supplied under pressure to the supporting conduit 15 through a supply conduit 32 connected to a refrigerating apparatus or other equipment which imparts heat to the water. The conduit 32 extends upwardly through the central aperture of a supporting base 33 and its upper end 34 telescopes into the lower end of the supporting conduit 15 and is disposed just below a collar 35 rigidly secured in the supporting pipe to increase the velocity of the flow of water at that point. The lower externally threaded end of the supporting conduit 15 extends into the upper internally threaded end 36 of a T-coupling 37. The lower internally threaded end 38 of the T-coupling receives the upper threaded end 39 of a seal compressing ring 40 whose lower annular surface 41 bears against the upper surface of a seal ring 42, made of any suitable resilient substance, which rests on a spacer sleeve 43. The seal ring is compressed to fit tightly against the supply conduit 32 to prevent leakage of water down past the supply conduit. The threaded joint between the lower end 38 of the T-coupling and the upper end 39 of the ring 40 is made tight in any suitable manner, as by the use of a sealing compound.

The spacer sleeve in turn rests on a tubular supporting member 44 whose lower threaded end engages the internally threaded central aperture of the supporting base 33. A fitting 45 is threaded on the upper end of the supporting member 44 and flares outwardly to contact the lower end 38 of the T-coupling to which it is rigidly connected by a weld 46 or in any other suitable manner.

It will be apparent that the supply conduit 32 is of smaller diameter than the supporting conduit 15 so that a substantially cylindrical space 47 is provided between the T-coupling, the lower end of the supporting conduit 15 and the upper portion of the supply conduit 32. Water may flow from the horizontal trough of the reservoir through a horizontal conduit 48 which extends through the wall 12 and is threaded into the horizontal extension 48 of the timer. The water can then flow upwardly from the cylindrical space 47 and into the supporting conduit 15 through the collar 35. The venturi effect created by the water flowing from the supply conduit 32 into the collar 35 and thence upwardly through the supporting conduit creates a pressure differential which causes water to be drawn from the cylindrical space 47, and therefore from the reservoir, up into the supporting conduit and thence to the upper end of the cooling tower to be discharged again over the disks for further cooling. The increase in velocity of the water caused by the restriction of the orifice by the collar 35 increases this pressure differential. It will be apparent, therefore, that the warm water flowing through the supply conduit 32 is mixed with cool water drawn from the reservoir before it is discharged over the disks. Moreover, it will be apparent that some of the water delivered by the supply conduit 32 will flow more than once over the disks being drawn in from the trough into the cylindrical space 47 by the venturi effect.

The cooled water in the reservoir is delivered back to the refrigerating apparatus or other equipment by a pump 50 which draws water from the reservoir through a conduit 51 which extends through the inner wall 12 of the reservoir and pumps it into return conduit 52. The pump is driven by a motor 53 which may be connected to any suitable source of electricity in a conventional manner.

In the illustrated embodiment, the cooling system is adapted for use with a refrigerating apparatus or other equipment which delivers the warm water under pressure to the supply conduit 32. If necessary, another pump could be employed to pump the warm water up the cooling tower.

Since water is continually being lost by evaporation during use of the cooling system, a means for replacing the evaporated water must be provided. The water replenishing means comprises a supply conduit 54 connected to any suitable source of water under pressure whose upper end is connected to a horizontal conduit 55 which extends through the inner wall 12 into the reservoir. A conventional valve 56 controlled by a float 57 controls the passage of water from supply conduit 54 to conduit 55 and, therefore, the replenishment of water in the reservoir. The float is disposed in a rectangular tank 58 which is supported on straps 59 whose outer ends are embedded in the inner wall 12. A tube 60 is disposed so that its open ends will be disposed in the tank 58 and in the reservoir in order to maintain the same level of water in the tank as in the reservoir. When the level of water in the reservoir drops below a predetermined level, the float also descends and opens the valve 56 to allow water to flow into the reservoir until the water is again raised to the predetermined level.

It will be seen now that the cooling system includes a tower 14 which causes water discharged through the upper end of the supporting conduit to flow over a series of disks to present a large area of water surface to the air to facilitate evaporation of the water and consequent cooling thereof. Moreover, it will be apparent that some of the cooled water collected in the reservoir 11 is recirculated by the venturi and mixed with incoming warm water to further decrease the temperature of the water in the reservoir before it is pumped back to the refrigerating apparatus or other equipment. Weep holes S are provided circumferentially about the base of the reservoir 11 for draining purposes.

While a preferred embodiment of the invention has been illustrated and described, it will be apparent that various changes and modifications can be made without departing from the invention, and it is intended, therefore, in the appended claims to cover all such changes and modifications as fall within the true spirit and scope of the invention.

What is claimed is:

1. A cooling system comprising a cooling tower; a compartment, a water reservoir surrounding said compartment, a water inlet pipe, a first conduit concentric with said inlet pipe for conducting warm water delivered by said inlet pipe to the upper end of the tower for discharge and descent over the tower, said reservoir disposed below the cooling tower for receiving water descending over the tower; a Venturi tube in said first conduit above the top of said inlet pipe therein; a second conduit within said compartment communicating with said first conduit below said Venturi tube and with said reservoir for recirculating water from said reservoir to the first conduit, water being drawn through said second conduit by suction created by water flowing upwardly through the first conduit and said Venturi tube; means communicating with the reservoir for withdrawing cooled water from the reservoir; a reservoir water replenishing pipe extending upwardly into said compartment, a valve thereon and float means in said compartment for automatically actuating said valve for maintaining the water in the reservoir at a predetermined level.

2. A cooling system comprising a cooling tower; a water inlet pipe; a first conduit enclosing and concentric with said inlet pipe for conducting warm water to the upper end of the tower for discharge and descent over the tower, a closed compartment, a reservoir surrounding said compartment below the cooling tower for receiving water descending over the tower, said inlet pipe terminating short of the top of said first conduit, a Venturi tube in said first conduit below the upper end of said inlet pipe, a second conduit communicating with said first conduit below said Venturi tube and with said reservoir for recirculating water from said reservoir to the first conduit, water being drawn through said second conduit by suction created by water flowing upwardly through the first conduit and said Venturi tube; a pump in said compartment having its intake in communication with said reservoir and its outlet remote therefrom for withdrawing cooled water from said reservoir, means for replenishing said reservoir and float actuated valve means for controlling said replenishing means.

3. A cooling system comprising a reservoir, a cooling tower disposed above said reservoir and comprising a vertical supporting conduit for conducting water to the upper end of the tower and discharging it over the tower, water descending over the tower collecting in said reservoir; a water supply pipe extending upwardly into said supporting conduit for delivering water under pressure to said supporting conduit, a member enclosing a lower portion of said supporting conduit and an upper portion of said water supply pipe and providing an annular space communicating with the lower end of the supporting conduit and the upper end of the supply conduit, a Venturi tube in said supporting conduit above said water supply pipe, the flow of water from the water supply pipe through the supporting conduit and said Venturi tube creating a suction between said bore of the supporting conduit and said annular space; and a conduit communicating with the reservoir and said annular space whereby water is drawn into the space and into the supporting conduit from the reservoir by said suction, pump actuated means for withdrawing cooled water from said reservoir, means for replenishing said reservoir with water and float actuated valve means for controlling said replenishing means to maintain the water in said reservoir at a predetermined level.

4. A cooling system comprising a reservoir, a cooling tower disposed above said reservoir and comprising a vertical supporting conduit for conducting water to the upper end of the tower and discharging it over the tower, water descending over the tower collecting in said reservoir; a water supply pipe extending into said supporting conduit for delivering water under pressure to said supporting conduit, a member enclosing a lower portion of said supporting conduit and an upper portion of said water supply pipe and providing a closed space communicating with the lower end of the supporting conduit and the upper end of the water supply pipe, a Venturi tube in said supporting conduit above the upper end of said supply pipe, the flow of water from the water supply pipe through the supporting conduit and said Venturi tube creating a suction between said bore of the supporting conduit and the space; a conduit communicating with the reservoir and the space whereby water is drawn into the space and into the supporting conduit from the reservoir by said suction; pump actuated means for withdrawing water from the reservoir, means for replenishing said reservoir with water and float actuated valve means for controlling ingress of water by way of said replenishing means to maintain a predetermined water level in said reservoir.

References Cited in the file of this patent

UNITED STATES PATENTS

| | | |
|---|---|---|
| 179,977 | Turrettini | July 18, 1876 |
| 236,297 | Backmann | Jan. 4, 1881 |
| 448,568 | Wood | Mar. 17, 1891 |
| 871,191 | Southam | Nov. 19, 1907 |
| 1,562,657 | Parker | Nov. 24, 1925 |
| 1,701,977 | Lakin | Feb. 12, 1929 |
| 1,790,489 | Sippel et al. | Jan. 27, 1931 |
| 1,953,372 | Stillger et al. | Apr. 3, 1934 |
| 2,123,892 | Grady | July 19, 1938 |
| 2,235,116 | Ray | Mar. 18, 1941 |
| 2,591,100 | Rouse | Apr. 1, 1952 |